(12) United States Patent
Genba

(10) Patent No.: US 7,110,004 B2
(45) Date of Patent: *Sep. 19, 2006

(54) IMAGE PROCESSOR CAPABLE OF EDGE ENHANCEMENT IN SATURATED REGION

(75) Inventor: Akira Genba, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/805,219

(22) Filed: Mar. 22, 2004

(65) Prior Publication Data

US 2004/0174381 A1    Sep. 9, 2004

Related U.S. Application Data

(63) Continuation of application No. 09/737,502, filed on Dec. 18, 2000, now Pat. No. 6,795,087.

(30) Foreign Application Priority Data

Feb. 15, 2000    (JP) .............................. 2000-041393

(51) Int. Cl.
    *G09G 5/00* (2006.01)
(52) U.S. Cl. ..................................................... 345/611
(58) Field of Classification Search .................... None
    See application file for complete search history.

(56) References Cited

U.S. PATENT DOCUMENTS

| | | | |
|---|---|---|---|
| 4,747,154 A | 5/1988 | Suzuki et al. ............... | 382/298 |
| 4,807,158 A | 2/1989 | Blanton et al. ............. | 345/581 |
| 4,908,780 A | 3/1990 | Priem et al. ................ | 345/611 |
| 5,426,733 A | 6/1995 | Masui ......................... | 345/574 |
| 5,548,706 A | 8/1996 | Koizumi et al. ............ | 715/502 |
| 5,720,021 A | 2/1998 | Murata et al. .............. | 345/581 |
| 5,903,276 A | 5/1999 | Shiraishi ..................... | 345/600 |
| 6,084,599 A | 7/2000 | Nakatsuka et al. ......... | 345/501 |
| 6,128,025 A | 10/2000 | Bright et al. ............... | 345/504 |
| 6,166,717 A | 12/2000 | Nakayama ................... | 345/611 |
| 6,236,405 B1 | 5/2001 | Schilling et al. ............ | 345/582 |
| 6,239,805 B1 | 5/2001 | Deering ....................... | 345/419 |
| 6,339,434 B1 | 1/2002 | West et al. .................. | 345/667 |
| 6,348,917 B1 | 2/2002 | Vaswani ...................... | 345/418 |
| 6,388,673 B1 | 5/2002 | Egan .......................... | 345/581 |
| 6,404,930 B1 | 6/2002 | Inuzuka et al. ............. | 382/235 |
| 6,448,976 B1 | 9/2002 | Nitta et al. .................. | 345/698 |
| 6,501,481 B1 | 12/2002 | Wood et al. ................. | 345/582 |
| 6,504,550 B1 | 1/2003 | Schlapp ...................... | 345/545 |
| 6,573,905 B1 | 6/2003 | MacInnis et al. ........... | 345/629 |
| 6,731,822 B1* | 5/2004 | Sobel et al. ................. | 382/264 |
| 2003/0099406 A1* | 5/2003 | Georgiev et al. ........... | 382/268 |
| 2003/0210828 A1* | 11/2003 | Georgiev et al. ........... | 382/254 |

OTHER PUBLICATIONS

U.S. Appl. No. 09/737,502, filed Dec. 18, 2000, Akira Genba.

* cited by examiner

*Primary Examiner*—Mark Zimmerman
*Assistant Examiner*—Enrique L. Santiago
(74) *Attorney, Agent, or Firm*—Staas & Halsey LLP

(57) ABSTRACT

An image processing device includes a data zone expansion circuit and an image processing circuit. The data zone expansion circuit receives input data, increases a number of data bits of the input data, and provides data with the increased number of data bits. The image processing circuit performs image processing on the data with the increased number of data bits.

4 Claims, 9 Drawing Sheets

IMAGE PROCESSOR CAPABLE OF EDGE ENHANCEMENT IN SATURATED REGION

CROSS-REFERENCE TO RELATED APPLICATIONS

This application is a continuation of application Ser. No. 09/737,502, filed Dec. 18, 2000 U.S. Pat. No. 6,795,087.

This application is based upon and claims the priority of Japanese application no. 2000-041393, filed Feb. 15, 2000, and U.S. patent application Ser. No. 09/737,502, filed Dec. 18, 2000, the contents being incorporated herein by reference.

BACKGROUND OF THE INVENTION

1. Field of the Invention

The present invention relates to an image processor incorporated in a display device such as a flat panel display device or a CRT display device, or connected to a display device.

2. Description of the Related Art

It has been required to improve image quality by processing digital image signals, in company with increase, in processing speed of an LSI.

FIG. 8 is a schematic block diagram showing a prior art image display device.

Digital image signals of three primary colors R, G and B are provided to respective image processing circuits 10R, 10G and 10B to perform filtering processing such as edge enhancement, and the results thereof are provided through a display control circuit 12 to an LCD panel 14 to display pictures on the panel 14. The display control circuit 12 includes a multi-port VRAM and a control circuit therefor.

However, as shown in FIG. 9, when an edge enhancement processing is followed by clipping in regions where pixels are saturated at the maximum value MAX0 or the minimum value no effect of the edge enhancement processing can be achieved.

SUMMARY OF THE INVENTION

Accordingly, it is an object of the present invention to provide a image processor capable of effectively performing an image processing such as an edge enhancement processing even in a region of saturated pixel values, with a simple construction.

In one aspect of the present invention, there is provided an image processing circuit comprising: a data zone expansion circuit, receiving input data X, expanding a data zone of the input data by linearly converting X to $(\alpha X+\beta)$, where $\alpha$ and $\beta$ are given values, providing the data-zone expanded data $(\alpha X+\beta)$; and an image processing circuit, performing image processing on the data-zone-expanded data $(\alpha X+\beta)$.

In the prior art, when an edge enhancement processing is applied on image data, an image processing effect such as edge enhancement could not be achieved in pixel value saturated regions at the maximum or minimum value. Such an effect can be achieved with this aspect having a simple construction that the data zone expansion circuit is provided at the preceding stage of the image processing circuit, thereby contributing to improvement in image quality.

Other aspects, objects, and the advantages of the present invention will become apparent from the following detailed description taken in connection with the accompanying drawings.

DETAILED DESCRIPTION OF THE PREFERRED EMBODIMENTS

Figure 1:
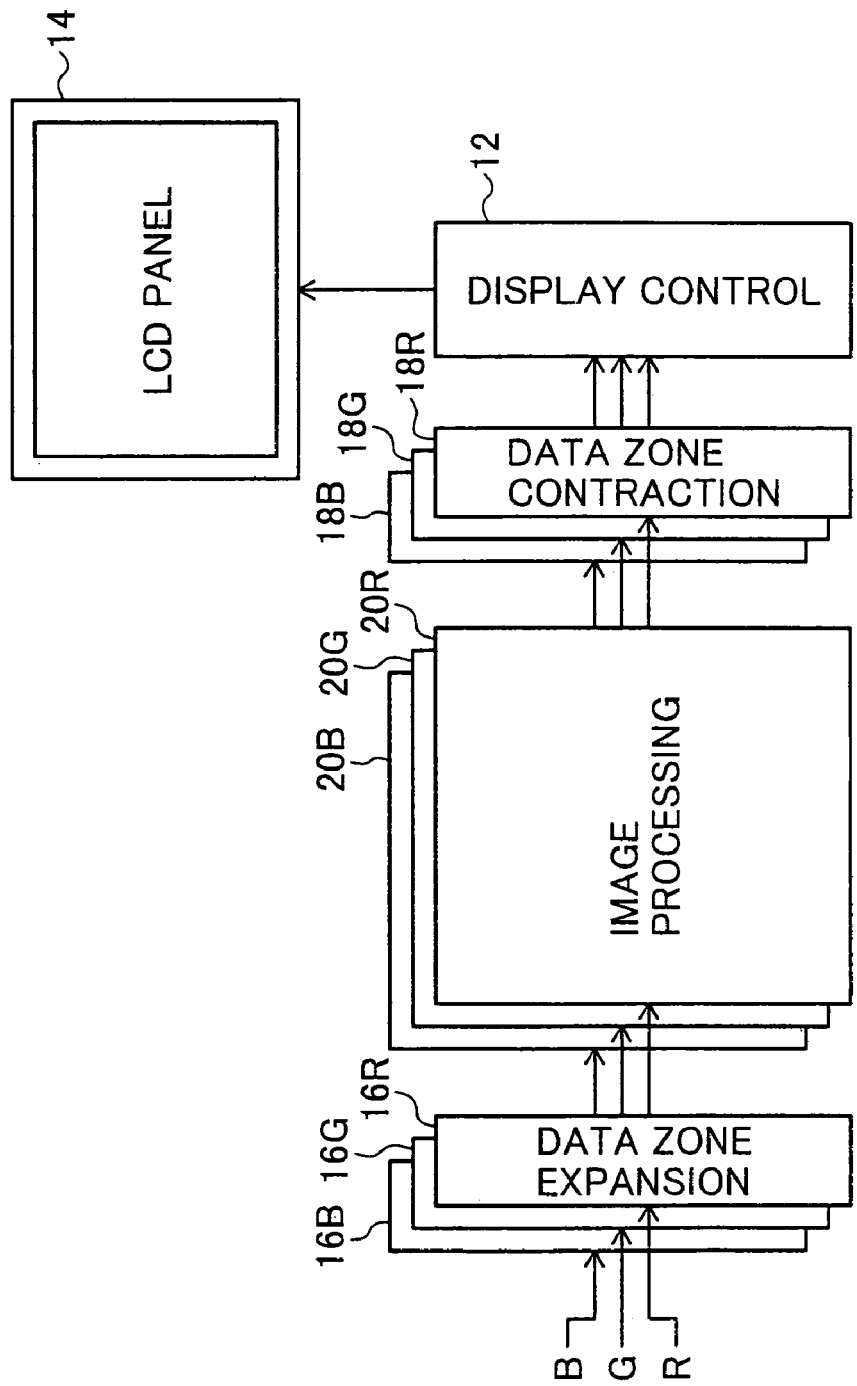
FIG. 1 is a schematic block diagram showing an image display device of a first embodiment according to the present invention.

Referring now to the drawings, wherein like reference characters designate like or corresponding parts throughout several views, preferred embodiments of the present invention are described below.

First Embodiment

FIG. 1 is a schematic block diagram showing an image display device of a first embodiment according to the present invention.

Digital image signals in three primary colors R, G and B are provided to data zone expansion circuits 16R, 16G and 16B, respectively.

The data zone expansion circuit 16R linearly converts an input signal R in a range of 0 to MAX0 to an output signal $(\alpha X R+\beta)$, in a range of 0 to MAX1 in order to accommodate the output signal with sufficient upper and lower margins. Herein, MAX1>MAX0, and $\alpha$ and $\beta$ are constants satisfying conditions of $\alpha>1$ and , $\beta \geq 0$. For simplification of a circuit, generally, $\alpha=2^n$, n is a positive integer and a is 0 or a positive integer.

Figure 4:
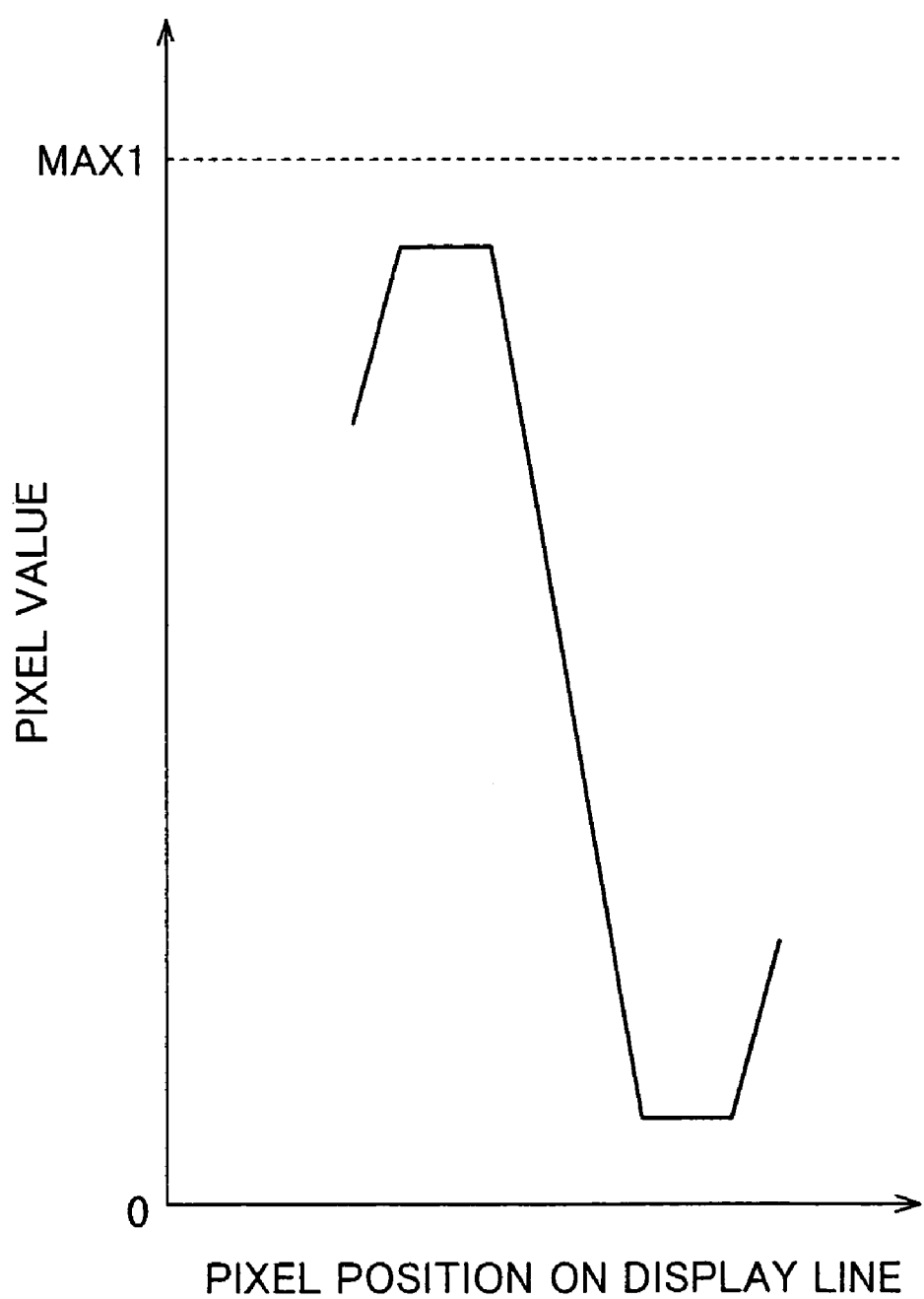
FIG. 4 is a graph showing a result of data zone expansion on data of FIG. 9, wherein an abscissa represents a pixel position on a display line and an ordinate represents a pixel value.
Figure 9:
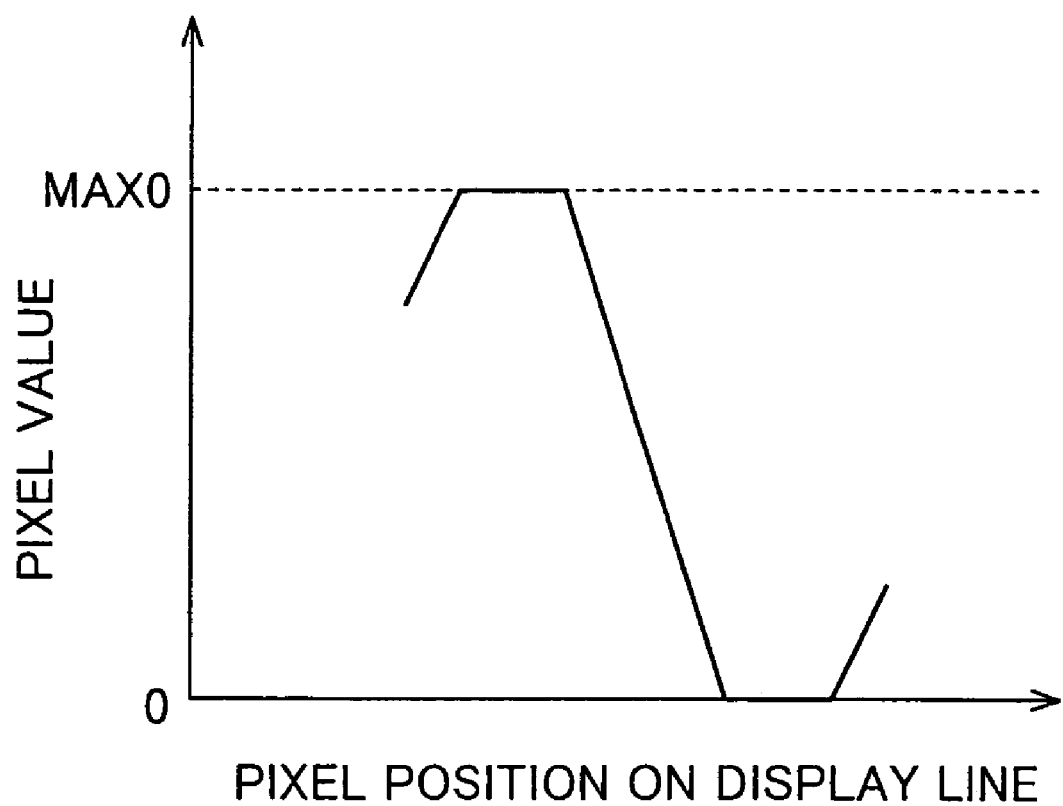
FIG. 9 is a graph showing an example of image data from which no effect is achieved even after an edge enhancement processing therefor with the display device of FIG. 8.

For example, the input signal R is a signal as shown in FIG. 9 having a pixel position on a display line as a time axis, and is converted to a signal shown in FIG. 4.

The minimum value 0 and the maximum value MAX0 of the input signal R are converted to $\beta$ and $\alpha X$ MAX0+$\beta$, respectively, and the following relation holds in order to accommodate the output signal with sufficient upper and lower margins.

$$0<\beta<\alpha X\ MAX0+<MAX1$$

That is, the converted minimum value $\mu$ and the converted maximum value $(\alpha X\ MAX0+\beta)$ are within an output data range of 0 to MAX1.

Figure 2:
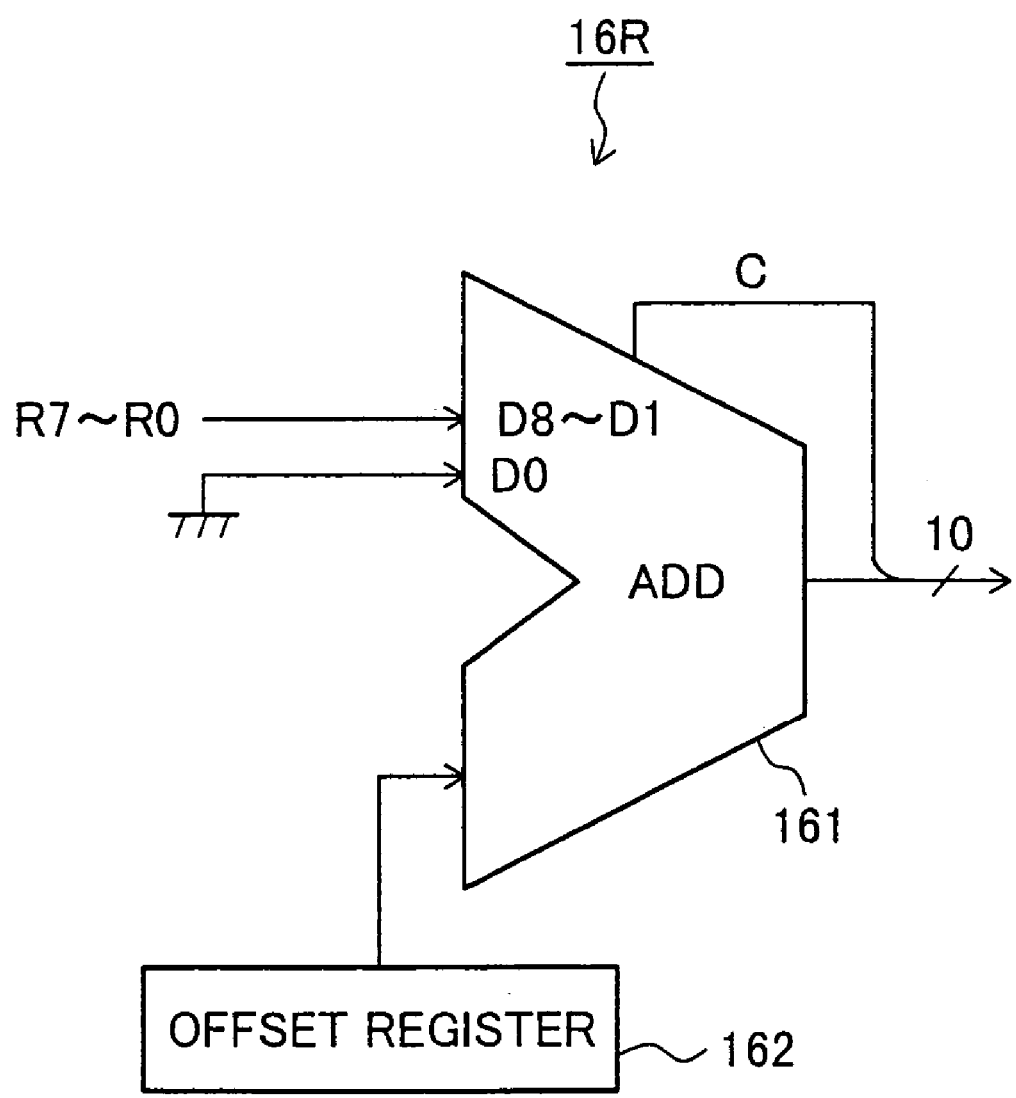
FIG. 2 is a block diagram showing an embodiment of the data zone expansion circuit of FIG. 1.

FIG. 2 shows an embodiment of the data zone expansion circuit 16R.

The data zone expansion circuit 16R includes an adder 161 and an offset register 161.

Assume that the input signal R has 8 bits R7 to R0. A first data input of the adder 161 is of 9 bits, and the R7 to RO bits are provided to the higher 8 bits D8 to D1 thereof while '0' is provided to the lowest one bit DO. That is, $\alpha=2$. The second data input of the adder 161 is, for example, of 4 bits, and the output a of the offset register 162 is provided to the second data input. A data output of the adder 161 is of 9 bits and an output of the data zone expansion circuit 16R is 10 bits having the 9 bits of the output and a carry bit C of the adder 161. In this case, the output data length of the data zone expansion circuit 16R is 10 bit for the input 8 bits.

This applies to cases of the data zone expansion circuits 16G and 16B in a similar manner.

Corresponding outputs from the data zone expansion circuits 16R, 16G and 16B are provided to image processing circuits 20R, 20G and 20B, respectively.

Figure 5:
FIG. 5 is a graph showing a result of an edge enhancement processing on data of FIG. 4.
Figure 8:
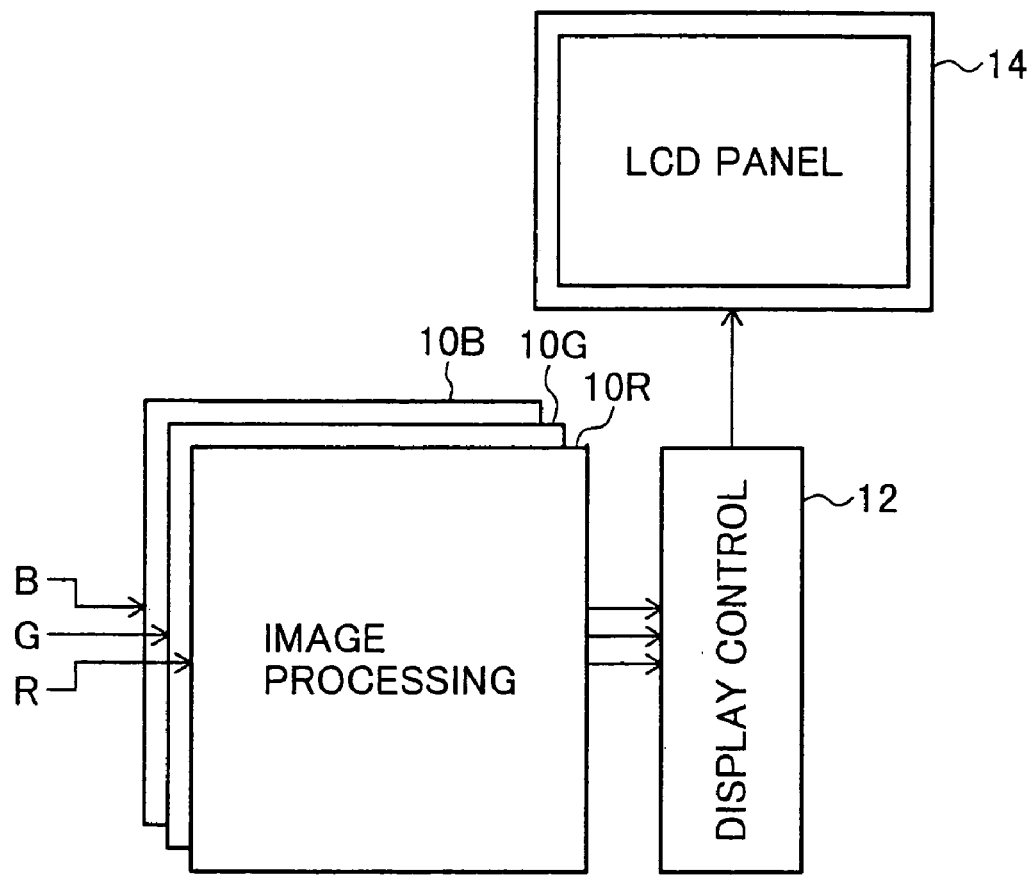
FIG. 8 is a schematic block diagram showing a prior art image display device.

The image processing circuit 20R differs from the image processing circuit 1OR of FIG. 8 in that a word length of a pixel value to be processed is larger than that of the input signal R. In the image processing circuit 20R, a filtering processing is performed such as edge enhancement or interpolation accompanying zoom in or out of an image. For example, when an edge enhancement processing is performed on image data shown in FIG. 4 by the image processing circuit 20R, data shown in FIG. 5 is obtained as a result.

This applies to cases of the image processing circuits 20G and 20B in a similar manner.

A display control circuit 12 and an LCD panel 14 have the same constructions as those of FIG. 8. Therefore, data zone contraction circuits 18R, 18G and 18B are connected between the respective image processing circuits 20R, 20G and 20B and the display control circuit 12, and perform the inverse of processing of the data zone expansion circuits 16R, 16G and 16B.

Figure 3:
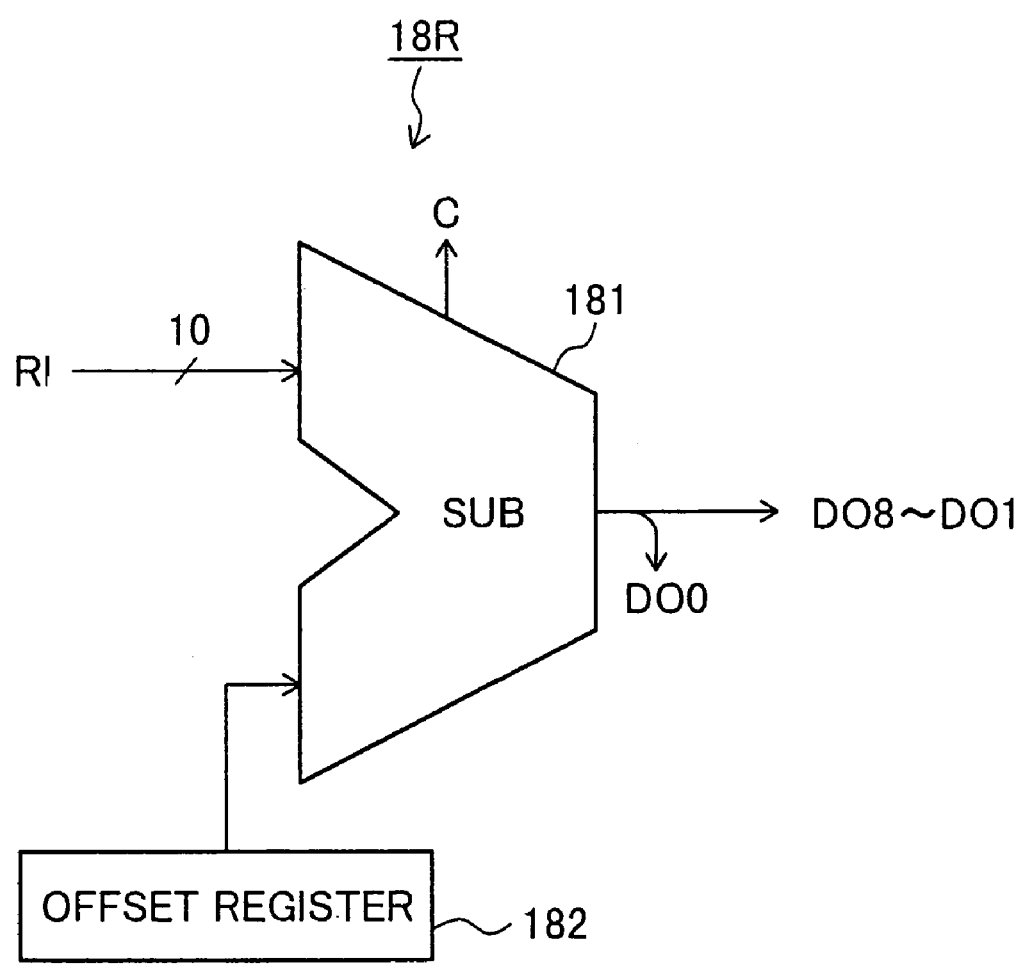
FIG. 3 is a block diagram showing an embodiment of the data zone contraction circuit of FIG. 1.

FIG. 3 shows an embodiment of the data zone contraction circuit 18R.

The data contraction circuit 18R includes a subtracter 181 and an offset register 182.

An output RI of the image processing circuit 20R is of 10 bits and provided to a first data input of the subtracter 181. The second data input of the subtracter 181 is, for example, of 4 bits and the output β of the offset register 182 is provided to the other data input. The carry C of the subtracter 181 is not used as one bit of the output of the data zone contraction circuit 18R. The output data of the subtracter 181 is of 9 bits D08 to D0O and the higher 8 bits D08 to D01 are of:the output D0=(RI-β)/α of the data zone contraction circuit 18R.

This applies to cases of the data zone contraction circuits 18G and 18B in a similar manner.

Figure 6:
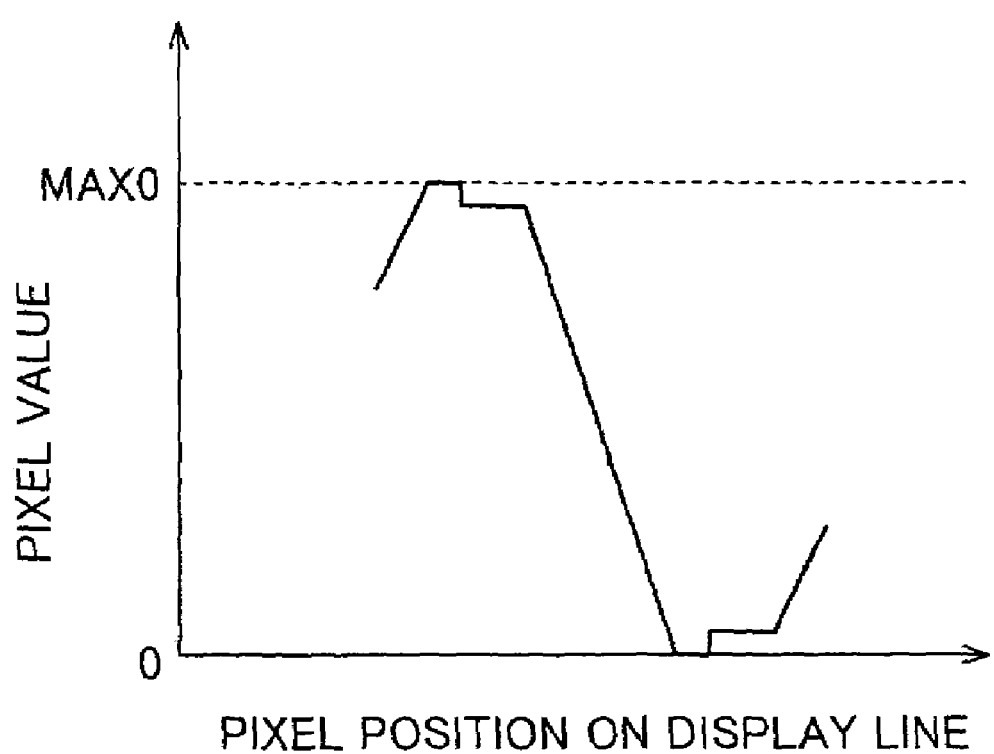
FIG. 6 is a graph showing a result of data zone contraction on data of FIG. 5.

For example, the data of FIG. 5 having a pixel position on a display line as a time axis is provided to the data zone contraction circuit 18R, and is converted to a signal shown in FIG. 6.

In the prior art, when an edge enhancement processing is performed on image data shown in FIG. 9, no effect of edge enhancement is achieved in saturated regions at the minimum value and the maximum value of pixels, while the effect can be achieved according to the first embodiment, leading to improvement on the image quality.

As a result of experiments, in a case where the input signals R, G and B are all of 8 bits and the word length of the output data of the data expansion circuit 16R is of 10 bits, the above described effect of the edge enhancement is able to be achieved when β=2 for the offset registers 162 and 182.

According to the first embodiment, it has a simple construction in which the data zone expansion circuit 16R and the data zone contraction circuit 18R are provided at stages before and after the image processing circuit 20R, respectively, and the image processing can be performed even in the pixel value saturated regions with improved image quality.

Second Embodiment

Figure 7A:
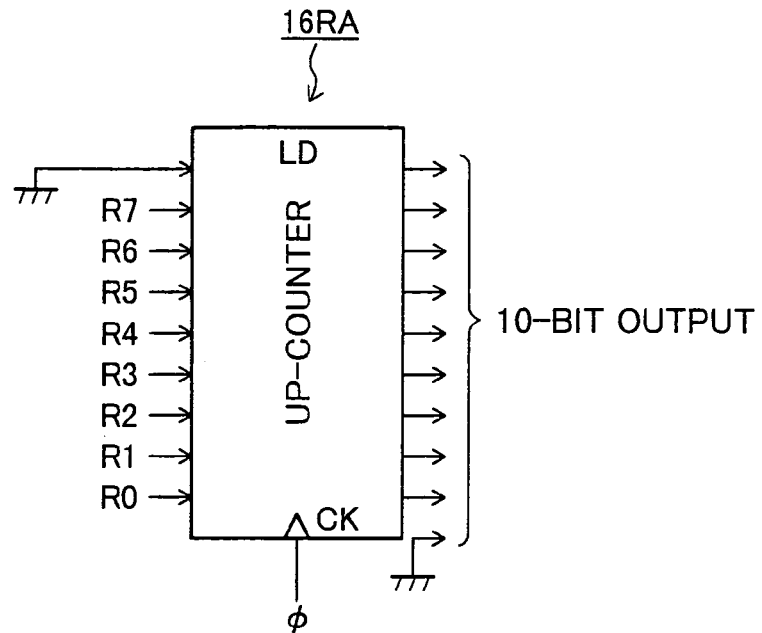
FIG. 7(A) is a block diagram showing a data zone expansion circuit employed in an image processor of a second embodiment according to the present invention.

FIG. 7(A) shows a data zone expansion circuit 16RA employed in an image processor of a second embodiment according to the present invention.

The circuit 16RA includes a 9 bit up-counter. The output of the data zone expansion circuit 16RA has a parallel output obtained by providing one pulse of a clock to the clock input CK after a parallel input R7 to RO is loaded on the counter, and an added lowest bit "0". The output is 2(R+1)=2R+2 for the input R. That is, $\alpha=2$ and $\beta=2$.

Figure 7B:
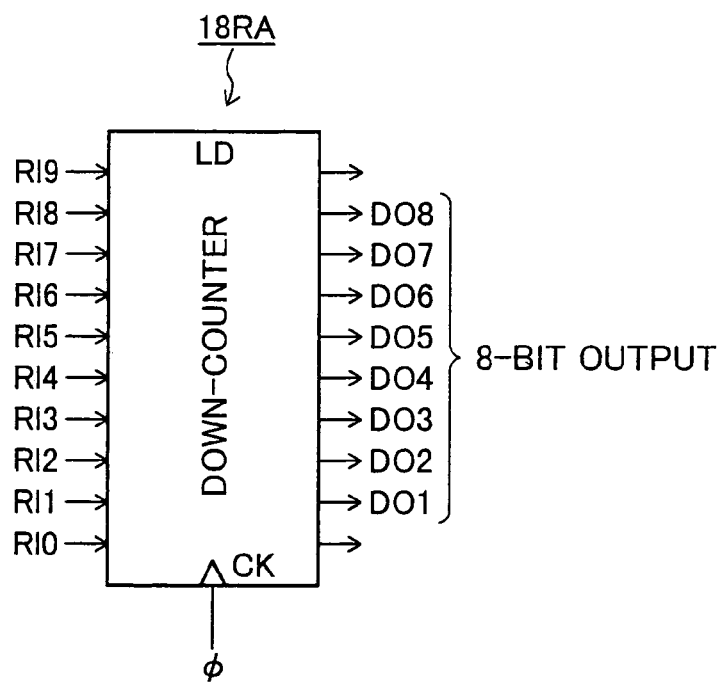
FIG. 7(B) is a block diagram showing a data zone contraction circuit employed in this image processor.

FIG. 7(B) shows a data zone contraction circuit 18RA employed in the image processor of the second embodiment according to the present invention.

The data zone contraction circuit 18RA includes a 10 bit down-counter. A parallel input RI9 to RIO is loaded on the counter, 2 pulses of the clock 0 are provided to the clock input CK thereof, and the output of the data zone contraction circuit 18R is obtained from an intermediate 8 bit parallel output D08 to D01 excluding LSB and MSB among 10 bits. The output is (RI-2)/2 for the input RI. That is, $\alpha=2$ and $\beta=2$.

The other points-are the same as those of the first embodiment.

Although preferred embodiments of the present invention has been described, it is to be understood that the invention is not limited thereto and that various changes and modifications may be made without departing from the spirit and scope of the invention.

Please note that various other kinds of modifications or alterations can be included in the present invention.

For example, there may be adopted a construction in which the data zone contraction circuit is omitted in FIG. 1.

Further, a linear transformation in the data zone contraction circuit is not limited to the inversion of the processing of the data zone expansion circuit. Accordingly, the output word length of the data zone contraction circuit may be different from the input word length of the data zone expansion circuit.

Furthermore, The value of β set in the offset register may be determined according to a lightness or a chroma of image. Fixed values may be provided to the adder 16 and the subtracter 181 without using the offset registers.

What is claimed:
1. An image processing method comprising the steps of:
receiving input data;
increasing a number of data bits of said input data:
performing image processing on said data with the increased number of data bits, wherein said image processing includes enhancing an edge of said data with the increased number of data bits;
decreasing a number of the image-decreased data; and
providing data having a number of data bits substantially the same as said received input data.

2. The image processing method of claim 1, further comprising the step of increasing the number of data bits of said input data by multiplying said input data by a constant value and adding an offset value to said input data, wherein a word length of said data with the increased number of data bits is larger than that of said input data.

3. The image processing method of claim 1, further comprising the step of decreasing the number of data bits of said image-processed data by subtracting an offset value from said image-processed data and dividing the result of the subtracting by a constant value, wherein a word length of the data with the decreased number of data bits is smaller than that of said image-processed data.

4. The image processing method of claim 2, further comprising the step of decreasing the number of data bits of said image-processed data by subtracting an offset value from said image-processed data and dividing the result of the subtracting by a constant value, wherein a word length of the data with the decreased number of data bite is smaller than that of said image-processed data.

* * * * *